United States Patent
Shimura et al.

[11] Patent Number: 5,500,922
[45] Date of Patent: Mar. 19, 1996

[54] PRINTER APPARATUS FOR ENLARGING OR REDUCING THE SIZE OF CHARACTERS

[76] Inventors: Akihiro Shimura; Satoshi Nagata; Shigeru Ueda, all c/o Canon Kabushiki Kaisha, 30-2, 3-chome, Shimomaruko, Ohta-ku, Tokyo, Japan

[21] Appl. No.: 384,219

[22] Filed: Feb. 6, 1995

Related U.S. Application Data

[63] Continuation of Ser. No. 89,063, Jul. 9, 1993, abandoned, which is a continuation of Ser. No. 586,975, Sep. 24, 1990, abandoned.

[30] Foreign Application Priority Data

Sep. 26, 1989 [JP] Japan .................... 1-251211

[51] Int. Cl.$^6$ ............................ G06T 3/40
[52] U.S. Cl. ............ 395/110; 395/139; 395/151
[58] Field of Search ............ 395/110, 139, 395/150, 151

[56] References Cited

U.S. PATENT DOCUMENTS

| | | | |
|---|---|---|---|
| 4,618,991 | 10/1986 | Tabata et al. | 382/46 |
| 4,655,622 | 4/1987 | Aoki | 400/121 |
| 4,827,358 | 5/1989 | Matsumoto | 358/296 |
| 5,093,903 | 3/1992 | Sudoh et al. | 395/139 X |

FOREIGN PATENT DOCUMENTS 2-63762  5/1990  Japan.

*Primary Examiner*—Mark K. Zimmerman

[57] ABSTRACT

A printer apparatus comprises: a holding circuit to hold a pattern of a character, a figure, or the like in a form such that it can be enlarged or reduced into an arbitrary size; a converter to convert the pattern of the character, figure, or the like which was held in the holding circuit into a printable dot image of an arbitrary size; and a forming circuit to form a reduced dot image of the character, figure, or the like by the converter in accordance with reduction ratios of a character pitch and a line pitch upon reduction printing in the printer emulation mode. With this apparatus, the reduced print image which accurately conforms with the reduction ratios can be obtained.

8 Claims, 5 Drawing Sheets

FIG. 2

| | | |
|---|---|---|
| 3 | | ( 3 : CLOSED CONTINUOUS LINE ) |
| 20 | | ( NO. OF POINTS : 20 ) |
| 0 | 0 | ( x , y ) |
| 12 | 0 | ( x , y ) |
| 12 | 6 | ( x , y ) |
| 10 | 6 | ( x , y ) |
| 14 | 15 | ( x , y ) |
| 40 | 15 | ( x , y ) |
| 44 | 6 | ( x , y ) |
| 42 | 6 | ( x , y ) |
| 42 | 0 | ( x , y ) |
| 54 | 0 | ( x , y ) |
| 54 | 6 | ( x , y ) |
| 50 | 6 | ( x , y ) |
| 31 | 47 | ( x , y ) |
| 34 | 47 | ( x , y ) |
| 34 | 53 | ( x , y ) |
| 20 | 53 | ( x , y ) |
| 20 | 47 | ( x , y ) |
| 23 | 47 | ( x , y ) |
| 4 | 6 | ( x , y ) |
| 0 | 6 | ( x , y ) |
| 3 | | ( 3 : CLOSED CONTINUOUS LINE ) |
| 3 | | ( NO. OF POINTS : 3 ) |
| 17 | 21 | ( x , y ) |
| 37 | 21 | ( x , y ) |
| 27 | 43 | ( x , y ) |
| 0 | | ( 0 : END ) |

$$\begin{pmatrix} X2 \\ Y2 \end{pmatrix} = \begin{pmatrix} S & O \\ O & S \end{pmatrix} \begin{pmatrix} A & B \\ C & D \end{pmatrix} \begin{pmatrix} X1 \\ Y1 \end{pmatrix}$$

404　403　402　401

CONTINUOUS SHEET
(254mm x 279.4mm)

LETTER SHEET
(215.9mm x 279.4mm)

$$\begin{pmatrix} X2 \\ Y2 \end{pmatrix} = \begin{pmatrix} SX & 0 \\ 0 & SY \end{pmatrix} \begin{pmatrix} A & B \\ C & D \end{pmatrix} \begin{pmatrix} X1 \\ Y1 \end{pmatrix}$$

604  603  402  401

PRINTER APPARATUS FOR ENLARGING OR REDUCING THE SIZE OF CHARACTERS

This application is a continuation of application Ser. No. 08/089,063, filed Jul. 9, 1993, now abandoned, which is a continuation of application Ser. No. 07/586,975, filed Sep. 24, 1990, now abandoned.

BACKGROUND OF THE INVENTION

1. Field of the Invention

The present invention relates to a printer apparatus in which a pattern of a character, a figure, or the like is held in a form such that the pattern can be enlarged or reduced to an arbitrary size and a reduction dot image of the character, figure, or the like is formed and printed in accordance with reduction ratios of a character pitch and a line pitch upon reduction printing in a printer emulation mode.

2. Related Background Art

A conventional printer apparatus reduces only the character pitch and line pitch and does not reduce the character size upon reduction printing in the printer emulation mode or the like.

However, in the conventional apparatus, upon reduction printing in the printer emulation mode or the like, only the character pitch and line pitch are reduced and the character size is not reduced, so that there is a drawback such that the character and line pitches are narrowed and a reduced print result which accurately conforms with the reduction ratios is not derived.

SUMMARY OF THE INVENTION

In consideration of the above drawbacks, it is an object of the invention to provide a printer apparatus comprising: means for holding a pattern of a character, a figure, or the like in a form such that the pattern can be enlarged or reduced to an arbitrary size; means for converting the pattern of the character, figure, or the like held by the holding means into the printable dot image of an arbitrary size; and means for forming and printing the reduction dot image of the character, figure, or the like by the converting means in accordance with reduction ratios of a character pitch and a line pitch upon reduction printing in a printer emulation mode or the like, wherein a reduced print result which accurately conforms with the reduction ratios is obtained.

BRIEF DESCRIPTION OF THE DRAWINGS

FIG. 2 is a diagram of an example of a character held in an arbitrary size in a form such that the character can be enlarged and reduced;

DETAILED DESCRIPTION OF THE PREFERRED EMBODIMENTS

FIGS. 1 to 5 are diagrams showing an embodiment of the apparatus of the invention.

Figure 1:
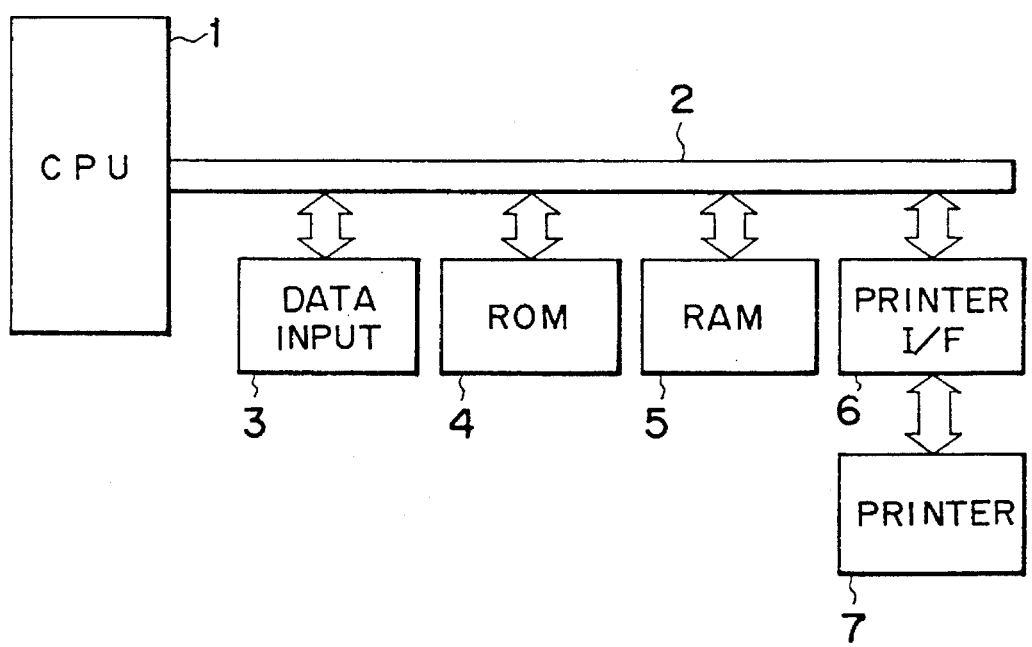
FIG. 1 is a block diagram of an apparatus of the invention.

FIG. 1 is a block diagram of the apparatus of the invention. In the diagram, reference numeral 1 denotes a CPU to control the whole apparatus; 2 indicates a bus of the CPU 1 including an address line, a data line, a control line, and the like; 3 a data input section to input data from a host computer or the like; and 4 a ROM to store programs, pattern data of a character, a figure, and the like, etc. The memory is not necessarily limited to the ROM 4 but may be a memory having the function to store the programs, pattern data of the character, figure, and the like, etc. shown in FIG. 7. Reference numeral 5 dentoes a RAM which is used as a work area, image forming area, and the like of the CPU 1; 6 indicates a printer interface; and 7 a printer as a printing mechanism portion such as wire dot printer, thermal printer, laser beam printer, or the like. The printer interface 6 converts a dot image into a form adapted to the mechanism of the printer 7 and executes, for instance, a process for converting parallel data into serial data or the like.

FIG. 2 shows an example in the case where a pattern of a figure, a figure, or the like was held in a form such that it can be enlarged or reduced in an arbitrary size and the outline of a character "A" was expressed by straight lines. Such a pattern is called an outline font, a vector font, or the like.

Figures 3, 4:
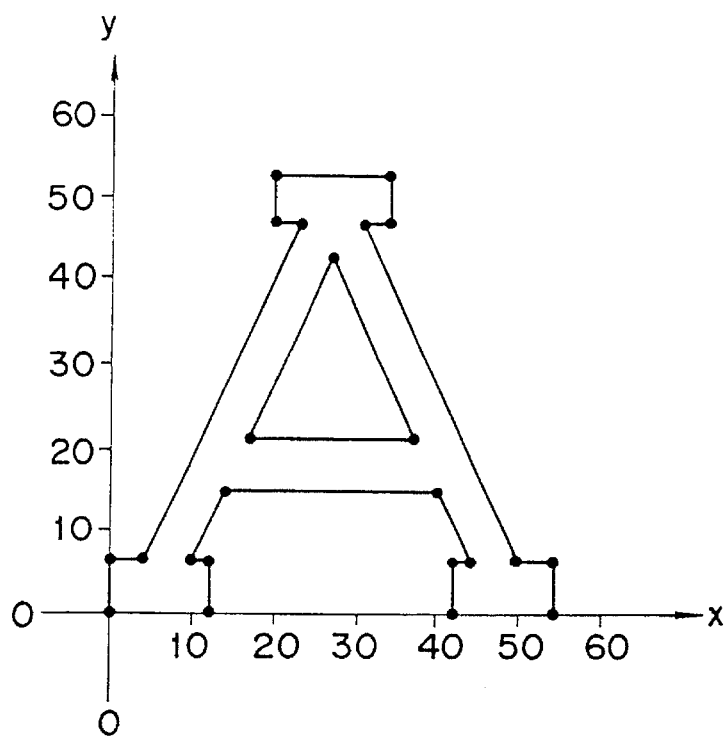
FIG. 3 is a diagram showing a shape of a character which is expressed by the data of FIG. 2.
FIG. 4 shows a transformation determinant in the first embodiment.

FIG. 3 shows a form of the character "A" which is expressed by the data of FIG. 2. The method of holding the pattern of a character, a figure, or the like in a form such that it can be enlarged or reduced in an arbitrary size is not limited to the method mentioned above as an example. It is possible to use a method of holding such a pattern by straight lines or various curves or by a combination thereof or the like if the pattern of a character, a figure, or the like can be held in a form such that it can be enlarged or reduced in an arbitrary size.

FIG. 4 shows a determinant for coordinate converting the pattern of the character, figure, or the like which was held in a form such that it can be enlarged or reduced in an arbitrary size as shown in FIG. 2 for the purpose of enlargement or reduction. Reference numeral 401 denotes (x, y) coordinates in the pattern of the character, figure, or the like which was held as shown in FIG. 2; 402 indicates a matrix for enlargement, reduction, or deformation in the equal magnification printing mode; 403 a reduction matrix to execute a reduction print; and 404 (x, y) coordinates which are used to actually convert into a dot image.

Figures 5, 6:
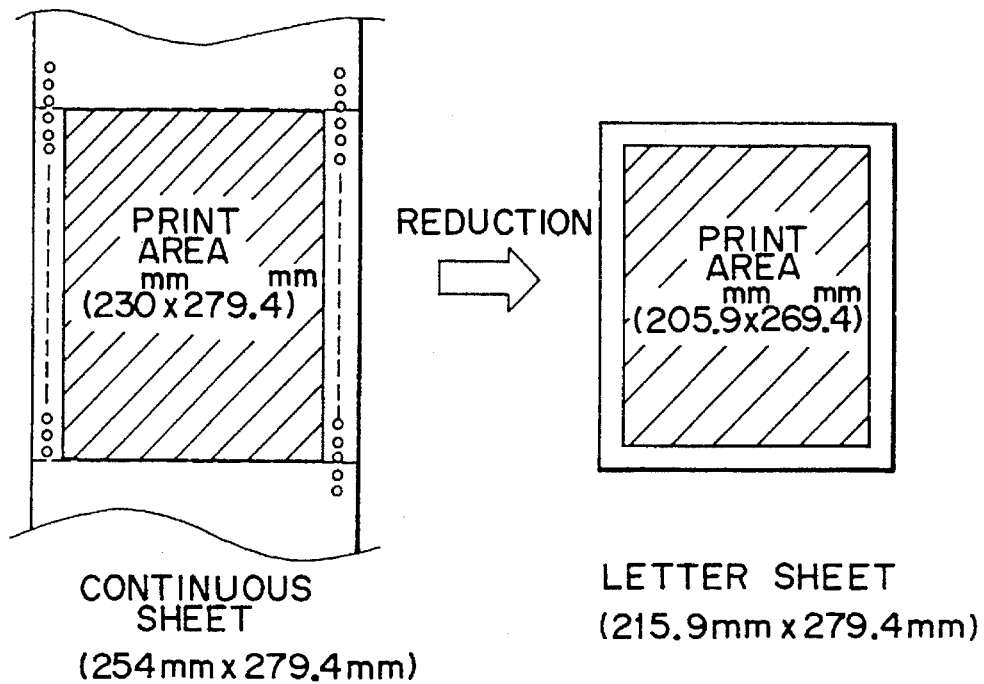
FIG. 5 is a diagram showing an example of a reduction print.
FIG. 6 is a diagram showing a transformation determinant in the second embodiment.

FIG. 5 is a diagram showing an example of the reduction print in the printer emulation mode. FIG. 5 shows a state in which an image which is printed to a continuous sheet having a print area of the size of 230 mm in the lateral direction and 279.4 mm in the vertical direction is reduced and printed onto a letter sheet having a print area of the size of 205.9 mm in the lateral direction and 269.4 mm in the vertical direction by the apparatus of the invention upon printing by a printer as an object of the emulation. A value of an element S in the reduction matrix 403 in the example of FIG. 5 is set to about 0.89.

Figure 7:
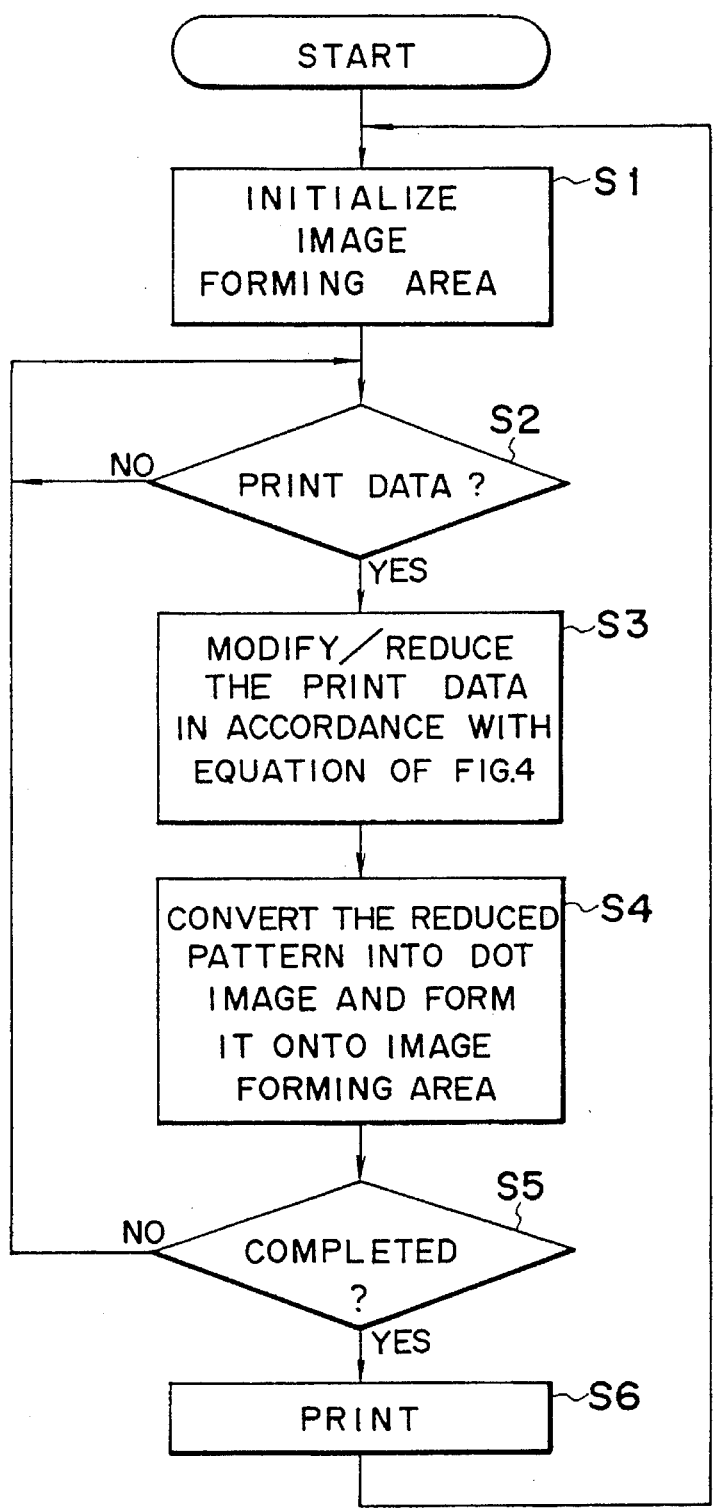
FIG. 7 is a flowchart showing a control procedure.

The operation of the printer apparatus with the above construction in the reduction mode such as a printer emulation mode or the like will now be described with reference to FIG. 7. First, an image forming area is initialized in step S1. If print data has been input from the data input section 3 in step S2, a pattern of a character, a figure, or the like in a form such that it can be enlarged or reduced into an arbitrary size as shown in FIG. 2 is deformed or reduced by a determinant as shown in FIG. 4 (S3). The reduced pattern is converted into a printable dot image. Further, the converted dot image is formed in an image forming area in the RAM 5 corresponding to the coordinates which are obtained by multiplying S to the print coordinates in the equal magnification printing mode (S4). The dot image is then output from the printer 7 via the printer interface 6 (S5, S6). For instance, in the example of FIG. 5, the data which is printed to an area of the coordinates (100 mm, 100 mm) by the 12-point size upon printing of the printer as an object of the emulation is reduced to the data of the 10.7-point size by the above operation and printed to an area of the coordinates (89 mm, 89 mm) (S6).

By the above embodiment, the reduced print result which accurately conforms with the reduction ratios is obtained upon reduction printing in the printer emulation mode or the like.

Another Embodiment

The present invention is not limited to the foregoing embodiment but many modifications and variations are possible within the spirit and scope of the appended claims of the invention.

For instance, the reduction matrix to reduce the pattern of a character, a figure, or the like is not limited to the matrix 403 shown in FIG. 4.

FIG. 6 shows a determinant showing an example of such a reduction matrix. Reference numeral 401 denotes the (x, y) coordinates in the pattern of the character, figure, or the like which was held in a form such that it can be enlarged or reduced into an arbitrary size as shown in FIG. 2; 402 indicates the matrix for enlargement, reduction, or deformation in the equal magnification mode; 603 a reduction matrix for the reduction print; and 604 (x, y) coordinates which are used when converting into the actual dot image.

Elements SX and SY of the reduction matrix 603 are independently set in accordance with the reduction ratios of the character pitch and line pitch, respectively.

By using the above method, the reduction ratios of a character, a figure, or the like upon reduction printing can be individually set in each of the vertical and lateral directions. The independent reduction ratios in the vertical and lateral directions of the sheet can be applied. In the example of FIG. 5, the elements SX and SY of the reduction matrix 603 can be also set in a manner such that SX≅0.89 and SY≅0.96.

The reduced print result which accurately conforms with the reduction ratios can be obtained even by the above deformation.

As described above, there is an effect such that the reduced print result which accurately conforms with the reduction ratios is obtained by providing the means for holding a pattern of a character, a figure, or the like in a form such that it can be enlarged or reduced into an arbitrary size, for reducing the pattern of the character, figure, or the like in accordance with the reduction ratios of the character and line pitches upon reduction printing in the printer emulation mode, and for forming and printing the reduced dot image.

What is claimed is:

1. A printer apparatus for printing data prepared for a continuous sheet on a cut sheet, said apparatus comprising:

means for storing a pattern of a character represented by non-dot matrix data;

means for converting the pattern of the character stored in said storing means into a printable dot image of an arbitrary size so as to enable printing of data prepared for a continuous sheet; and means for controlling said converting means to convert the pattern of the character into a reduced dot image of the character in accordance with reduction ratios of a character pitch and a line pitch upon printing the data prepared for the continuous sheet on the cut sheet.

2. A printer apparatus according to claim 1, wherein the pattern of the character in said storing means is outline font data which expresses the outline of the pattern by a coordinate dot train.

3. A printer apparatus according to claim 1, wherein the size of the dot image can be independently determined in vertical and horizontal directions.

4. A printer apparatus according to claim 1, further comprising a laser beam printer, wherein said storing means, said converting means and said control means perform their functions in conjunction with a memory work area.

5. A method of printing data prepared for a continuous sheet on a cut sheet, said method comprising the steps of:

storing a pattern of a character represented by non-dot matrix data;

converting the pattern of the character stored in said storing step into a printable dot image of an arbitrary size so as to enable printing of data prepared for a continuous sheet; and controlling said converting step to convert the pattern of the character into a reduced dot image of the character in accordance with reduction ratios of a character pitch and a line pitch upon printing the data prepared for the continuous sheet on the cut sheet.

6. A method according to claim 5, wherein the pattern of the character stored in said storing step is outline font data which expresses the outline of the pattern by a coordinate dot train.

7. A method according to claim 5, wherein the size of the dot image can be independently determined in vertical and horizontal directions.

8. A method according to claim 5, wherein said storing step, said converting step and said control step are performed in conjunction with a memory work area.

* * * * *

UNITED STATES PATENT AND TRADEMARK OFFICE
CERTIFICATE OF CORRECTION

PATENT NO. : 5,500,922
DATED : March 19, 1996
INVENTOR(S) : AKIHIRO SHIMURA, ET AL.

It is certified that error appears in the above-indentified patent and that said Letters Patent is hereby corrected as shown below:

ON THE COVER PAGE

[76] Inventors

"[76] Inventors: Akihiro Shimura; Satoshi Nagata; Shigeru Ueda, all c/o Canon Kabushiki Kaisha, 30-2, 3-chome, Shimomaruko, Ohta-ku, Tokyo, Japan"

should read:

--[75] Inventors: Akihiro Shimura, Tokyo; Satoshi Nagata, Tama; Shigeru Ueda, Wako; all of Japan

[73] Assignee: Canon Kabushiki Kaisha, Tokyo, Japan--

UNITED STATES PATENT AND TRADEMARK OFFICE
CERTIFICATE OF CORRECTION

PATENT NO. : 5,500,922
DATED : March 19, 1996
INVENTOR(S) : AKIHIRO SHIMURA, ET AL.

It is certified that error appears in the above-indentified patent and that said Letters Patent is hereby corrected as shown below:

[56] References Cited

After "Primary Examiner - Mark K. Zimmerman", insert
   -- Attorney, Agent, or Firm - Fitzpatrick, Cella,
   Harper & Scinto--.

Signed and Sealed this

Fifteenth Day of October, 1996

Attest:

BRUCE LEHMAN

*Attesting Officer*    *Commissioner of Patents and Trademarks*